(12) United States Patent
Malcus et al.

(10) Patent No.: US 8,377,412 B2
(45) Date of Patent: Feb. 19, 2013

(54) METHODS FOR PREPARING INORGANIC COMPOUNDS HAVING A SUBSTANTIALLY SINGLE PHASE, HEXAGONAL LAYERED CRYSTAL STRUCTURE THAT IS SUBSTANTIALLY FREE FROM CUBIC-SPINEL LIKE PHASES

(75) Inventors: Stefan Malcus, Goslar (DE); Kai-Uwe Clauswitz, Gladenbach (DE)

(73) Assignee: Toda Kogyo Europe GmbH, Dusseldorf (DE)

( * ) Notice: Subject to any disclaimer, the term of this patent is extended or adjusted under 35 U.S.C. 154(b) by 647 days.

(21) Appl. No.: 11/922,414

(22) PCT Filed: Jun. 23, 2006

(86) PCT No.: PCT/EP2006/006063
§ 371 (c)(1),
(2), (4) Date: Jul. 2, 2009

(87) PCT Pub. No.: WO2007/000286
PCT Pub. Date: Jan. 4, 2007

(65) Prior Publication Data
US 2009/0299922 A1 Dec. 3, 2009

(30) Foreign Application Priority Data
Jun. 28, 2005 (EP) .................... 05013925

(51) Int. Cl.
*C01G 45/00* (2006.01)
(52) U.S. Cl. .................................... 423/594.4
(58) Field of Classification Search ................ 423/594.4
See application file for complete search history.

(56) References Cited

U.S. PATENT DOCUMENTS

| | | | |
|---|---|---|---|
| 2004/0072072 A1 | 4/2004 | Suzuki et al. | |
| 2004/0179993 A1 | 9/2004 | Dahn et al. | |
| 2004/0199436 A1 | 10/2004 | Reznek et al. | |
| 2004/0234854 A1 | 11/2004 | Kang et al. | |
| 2005/0019659 A1* | 1/2005 | Shiozaki et al. | 429/231.3 |
| 2005/0079416 A1 | 4/2005 | Ohzuku et al. | |

FOREIGN PATENT DOCUMENTS

| | | |
|---|---|---|
| EP | 0 872 450 | 10/1998 |
| EP | 0 944 125 | 9/1999 |
| EP | 1 193 782 | 4/2002 |
| EP | 1 372 202 | 12/2003 |
| EP | 1 391 950 | 2/2004 |
| EP | 1 447 866 | 8/2004 |
| EP | 1 469 539 | 10/2004 |
| JP | 2000-133262 | 5/2000 |
| JP | 2003-059490 | 2/2003 |
| JP | 2003-197256 | 7/2003 |
| JP | 2005-53764 | 3/2005 |
| WO | 2004-097964 | 11/2004 |

OTHER PUBLICATIONS

International Search Report for PCT/EP06/006063 mailed Oct. 2, 2006.

* cited by examiner

*Primary Examiner* — Steven Bos
(74) *Attorney, Agent, or Firm* — Nixon & Vanderhye P.C.

(57) ABSTRACT

The present invention relates to compounds having a hexagonal layered structure that is substantially free from cubic-spinel like phases, a process for preparing the same and the use thereof.

8 Claims, 2 Drawing Sheets

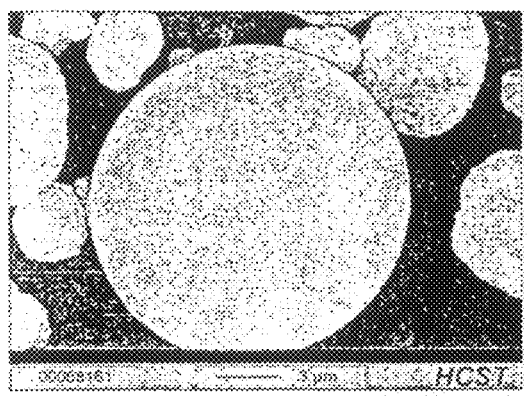
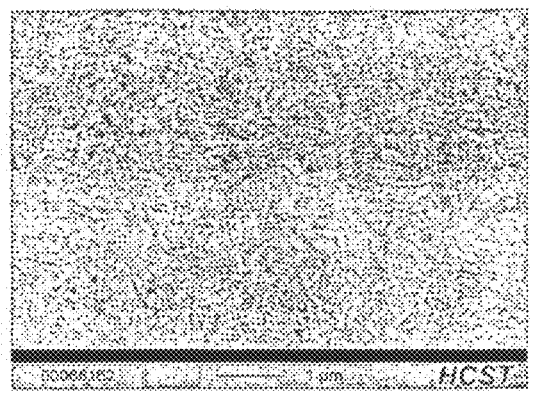
Fig. 3a
Fig. 3b
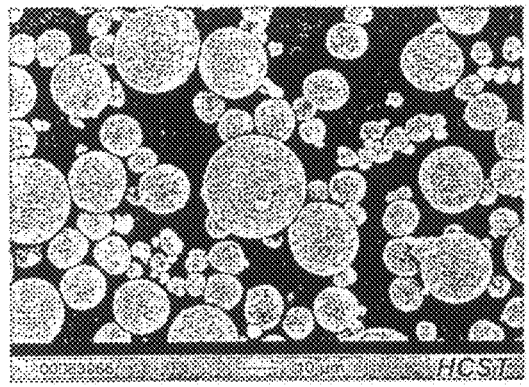
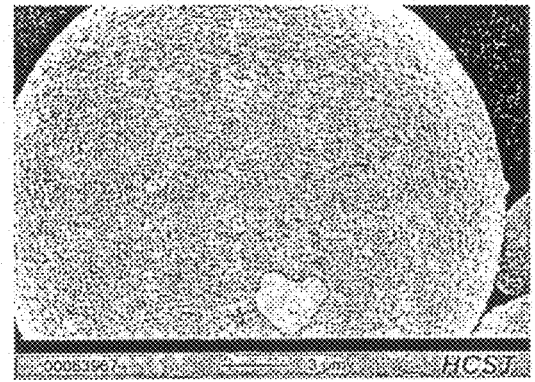
Fig. 4a
Fig. 4b

METHODS FOR PREPARING INORGANIC COMPOUNDS HAVING A SUBSTANTIALLY SINGLE PHASE, HEXAGONAL LAYERED CRYSTAL STRUCTURE THAT IS SUBSTANTIALLY FREE FROM CUBIC-SPINEL LIKE PHASES

This application is the U.S. national phase of International Application No. PCT/EP2006/006063 filed 23 Jun. 2006 which designated the U.S. and claims priority to European Patent Application No. 05013925.2 filed 28 Jun. 2005, the entire contents of each of which are hereby incorporated by reference.

The present invention relates to lithium metal oxides for use as positive electrode materials for lithium and lithium-ion secondary batteries, and to methods of making lithium metal oxides.

Lithium metal oxides of the formula $LiMO_2$, wherein M is a transition metal, are important cathode (positive electrode) materials for rechargeable lithium and lithium-ion batteries. Examples of $LiMO_2$ compounds include $LiCoO_2$, $LiNiO_2$, and $LiMnO_2$. Presently, $LiCoO_2$ is used in most commercial lithium and lithium-ion batteries as a cathode material.

$LiMO_2$ compounds can have different crystal structures and phases, even within the same compound. For example, $LiCoO_2$ synthesized at greater than 700° C. has a hexagonal layered structure analogous to $\alpha$-$NaFeO_2$. $LiCoO_2$ synthesized at around 400° C., however, has a cubic spinel-like structure analogous to $Li_2Ti_2O_4$.

Both structures have essentially the same FCC (face centered cubic) closed packed arrangement for oxygen except the layered structure has a small distortion in the direction perpendicular to the layers. Additionally, the two structures differ in cation arrangement.

It has been determined that the cubic spinel-like $LiCoO_2$ turns into hexagonal layered $LiCoO_2$ when heated to temperatures above 700° C. Therefore, phase transformation between the two structures is possible and the layered structure is energetically favored only at high temperatures. Layered $LiCoO_2$ also has an energetically favored tendency of changing into spinel $LiCo_2O_4$ when 50% of the lithium ions are removed from the $LiCoO_2$ during electrochemical charging. See A. van der Ven et al., Phys. Rev. B 58, 2975 (1998); and H. Wang et al., J. Electrochem. Soc., 146, 473 (1999). The spinel-like $LiCoO_2$ and spinel $LiCo_2O_4$ also have essentially the same atom arrangement except that lithium is at the octahedral 16c site in spinel-like LiCoO2 and at tetrahedral 8a site in spinel $LiCo_2O_4$.

The tendency of the phase transformation from hexagonal layered $LiMO_2$ to cubic spinel-like $LiMO_2$ is not unique to $LiCoO_2$. Layered $LiMnO_2$ also turns into spinel-like $LiMnO_2$ only after a few cycles in an electrochemical cell.

Although a cubic spinel-like $LiNiO_2$ has not been experimentally observed, $Li_{0.5}NiO_2$ (50% delithiated $LiNiO_2$) will indeed turn into $LiNi_2O_4$ spinel.

The electrochemical performance of $LiMO_2$ compounds having a cubic spinel-like structure has been found to be particularly poor, especially compared to layered structures. Moreover, the mere presence of the cubic spinel-like structural phase within the layered phase or on the surface of the layered phase has also been found to be detrimental to battery performance. In particular, the presence of cubic spinel-like phases within the layered crystal structure impedes the diffusion of lithium ions during the charge and discharge cycles of the rechargeable lithium or lithium-ion battery. Furthermore, because the cubic spinel-like phase is energetically favored and only kinetic limitations prevent large scale phase transformation, the presence of localized cubic spinel-like structures can act as a seed for phase transformation to readily occur in the $LiMO_2$ compound. Therefore, even the minor presence of cubic spinel-like phases, even at levels that cannot be detected by bulk techniques, such as powder x-ray diffraction (XRD), can cause problems in battery cycling.

The above identified problems of the art are solved by the compounds according to the invention as set out in claims 1 to 5, the method for making the same as set out in claims 9 to 16, the use thereof as set out in claim 17 and the products produced therefrom according to claims 6 to 8.

The present invention provides lithium metal oxides that are substantially single-phase compounds having hexagonal layered crystal structures that are substantially free of localized cubic spinel-like structural phases. Therefore, the lithium metal oxides of the invention have more consistent electrochemical performance than prior art compounds. In addition, the lithium metal oxide compounds of the invention have good structural stability and maintain their structure through cycling. Therefore, the lithium metal oxides of the invention are useful for rechargeable lithium and lithium ion secondary batteries. The lithium metal oxides of the invention have the formula $Li_xNi_aCo_bMn_cO_2$, wherein a, b and c are independently of each other a number from 0.05 to 0.8, in particular from 0.1 to 0.77, the sum of a, b and c being $0.95 \leq 1 \leq 1.02$, in particular $0.97 \leq 1 \leq 1.00$, and x being a number from 0.98-1.05, in particular from 1.00-1.03, while x+a+b+c=2. More specifically, a is a number from 0.05 to 0.8, b is a number from 0.02 to 0.60, c is a number from 0.05-0.60, more specifically a is a number from 0.1 to 0.77, b is a number from 0.05-0.50, c is a number from 0.10-0.50. The sum of a, b and c is $0.95 \leq 1 \leq 1.02$, more specifically the sum of a, b and c being $0.97 \leq 1 \leq 1.00$. x is a number from 0.98-1.05, more specifically x is a number from 1.00-1.03. The sum of the indexes x, a, b, and c is 2, that means, x+a+b+c=2. The compound of formula $Li_xNi_aCo_bMn_cO_2$ according to the invention has a substantially single phase, hexagonal layered crystal structure and is substantially free of localized cubic spinel-like structural phases.

In a further embodiment of the invention, the lithium metal oxides of the invention have the formula $Li_xNi_aCo_bMn_cO_2$ wherein
a is a number from 0.05 to 0.8,
b is a number from 0.02 to 0.60,
c is a number from 0.05-0.60,
x is a number from 0.98-1.05,
the sum of a, b and c is $0.95 \leq 1 \leq 1.02$, and
the sum of the indexes x, a, b, and c is 2;
or
a is a number from 0.1 to 0.77,
b is a number from 0.05-0.50,
c is a number from 0.10-0.50,
x is a number from 1.00-1.03,
the sum of a, b and c is $0.97 \leq 1 \leq 1.00$, and
the sum of the indexes x, a, b, and c is 2.

More specifically, a is 0.5, b is 0.2, c is 0.3; or a is 0.77, b is 0.13, c is 0.1; or a is 0.7, b is 0.2, c is 0.1. More preferably, at least two of the numbers a, b or c are equal, for example with a=0.25, b=0.25, c=0.5; or a=0.25, b=0.5, c=0.25; or a=0.5, b=0.25, c=0.25; or a=0.475, b=0.05, c=0.475; or a, b and c are all equal 0.33.

The molar ratio of lithium to the other metals can be larger than one as in some cases a certain quantity of lithium can be incorporated into the crystal layers of the transition metals. The lithium crystal layers will be free of transition metals though so that the Li-diffusion in these layers is not hindered.

As measured using powder x-ray diffraction, the $Li_xNi_aCo_bMn_cO_2$ compounds according to the invention preferably have no diffraction peaks at a smaller scattering angle than the diffraction peak corresponding to Miller indices (003). In addition, the ratio of the peak height of the diffraction peak corresponding to Miller indices (104) to the peak height of the diffraction peak corresponding to Miller indices (003) using powder x-ray diffraction is usually from 0.4 to 0.8, more specifically from 0.45 to 0.75, or from 0.45 to 0.65 or from 0.5 to 0.75. Even more specifically, the ratio of the peak height of the diffraction peak corresponding to Miller indices (104) to the peak height of the diffraction peak corresponding to Miller indices (003) using powder x-ray diffraction of the lithium metal oxides of the formula $Li_xNi_aCo_bMn_cO_2$ is 0.45 to 0.65 when a, b and c are all equal 0.33 or the ratio is 0.5 to 0.75 when a is 0.77, b is 0.13, c is 0.1.

In one preferred embodiment of the invention, the $Li_xNi_aCo_bMn_cO_2$ compound is selected from the group consisting of $LiNi_{0.33}Co_{0.33}Mn_{0.33}O_2$, $LiNi_{0.475}Co_{0.05}Mn_{0.475}O_2$, $LiNi_{0.5}Co_{0.2}Mn_{0.3}O_2$, $LiNi_{0.7}Co_{0.2}Mn_{0.1}O_2$ and $LiNi_{0.77}Co_{0.13}Mn_{0.1}O_2$.

The $Li_xNi_aCo_bMn_cO_2$ compounds are substantially single-phase lithium metal oxide compounds having hexagonal layered crystal structures that are substantially free of localized cubic spinel-like structural phases.

The present invention further includes lithium and lithium ion secondary batteries including a positive electrode comprising a compound having the formula $Li_xNi_aCo_bMn_cO_2$, wherein a, b, c and x are as defined above, said compound having a substantially single phase, hexagonal layered crystal structure and being substantially free of localized cubic spinel-like structural phases.

The present invention further includes a method of preparing compounds having a substantially single phase, hexagonal layered crystal structure that are substantially free of localized cubic spinel-like structural phases. A lithium metal oxide having the formula $Li_xNi_aCo_bMn_cO_2$, wherein a, b, c and x are as defined above, is provided at a temperature of at least about 600 C, and preferably of greater than 800 C. The lithium metal oxide is then cooled at a rate of less than 20° C./min, preferably less than 10° C., or less than 8° C. or at a temperature of between 3° C./min and 20° C./min, more preferably between 3° C./min and 14° C./min or from 3 to 9° C. The lithium metal oxide can be synthesized at a temperature of at least about 600 C, and preferably of greater than 800 C, and then cooled at these rates, or the lithium metal oxide can be previously synthesized, heated to a temperature of at least about 600 C, and preferably of greater than 800 C, and then cooled at these rates. The lithium metal oxide is preferably uniformly cooled to provide homogeneity throughout the material being produced.

In a preferred method embodiment of the invention, the $Li_xNi_aCo_bMn_cO_2$ compound is $LiNi_{0.33}Co_{0.33}Mn_{0.33}O_2$ and is prepared by the method of the invention using a lithium source compound and a mixed metal source compound. In particular, the preferred lithium source compound is selected from the group consisting of $Li_2Co_3$ and $LiOH.H_2O$ and the preferred mixed metal source compound is selected from the group consisting of $NiCoMnO_4$, $Ni_{0.33}Co_{0.33}Mn_{0.33}(OH)_2$, $Ni_{0.475}Co_{0.05}Mn_{0.475}(OH)_2$, $Ni_{0.5}Co_{0.2}Mn_{0.3}(OH)_2$, $Ni_{0.7}Co_{0.2}Mn_{0.1}(OH)_2$ and $Ni_{0.77}Co_{0.13}Mn_{0.1}(OH)_2$.

These and other features and advantages of the present invention will become more readily apparent to those skilled in the art upon consideration of the following detailed description and accompanying drawings, which describe both the preferred and alternative embodiments of the present invention.

In the drawings,

FIG. 3a shows the shape of the agglomerate particles of the source compounds comprising nickel, cobalt and manganese, FIG. 3b shows the rice-corn-like-shape of the primary particles.

FIG. 4a shows the shape of the agglomerate particles of the $Li_xNi_aCo_bMn_cO_2$ compound according to the invention (sample 2), FIG. 4b shows the spherical shape of the primary particles.

Figure 1:
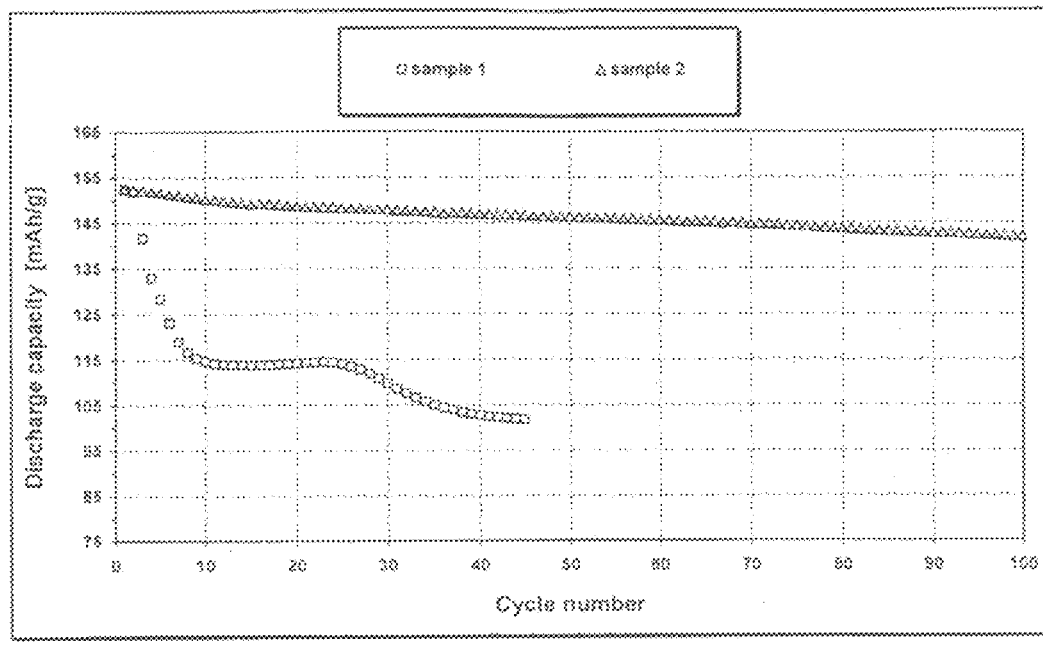
FIG. 1 is a graph comparing the cycle performance between a comparative compound (sample 1) and a compound according to the invention (sample 2).

The present invention is directed to substantially single-phase lithium metal oxide compounds having hexagonal layered crystal structures that are substantially free of localized cubic spinel-like structural phases on the surface of the crystal or within the crystal. The lithium metal oxides of the invention have the formula $Li_xNi_aCo_bMn_cO_2$, wherein a, b, c and x are as defined above. As would be readily understood by those skilled in the art, the average oxidation state of Ni, Co and Mn is based on the molar amounts of these metals present.

The substantially single-phase, hexagonal layered structures of the compounds of the invention can be characterized, for example, by their powder x-ray diffraction patterns. Typically, as measured using powder x-ray diffraction, the $Li_xNi_aCo_bMn_cO_2$ compounds according to the invention preferably have no diffraction peaks at a smaller scattering angle than the diffraction peak corresponding to Miller indices (003) thereby demonstrating that the compounds of the invention are substantially single phase. As measured using powder x-ray diffraction, the $Li_xNi_aCo_bMn_cO_2$ compounds according to the invention preferably have no diffraction peaks at a smaller scattering angle than the diffraction peak corresponding to Miller indices (003). In addition, the ratio of the peak height of the diffraction peak corresponding to Miller indices (104) to the peak height of the diffraction peak corresponding to Miller indices (003) using powder x-ray diffraction is usually from 0.4 to 0.8, more specifically from 0.45 to 0.75, or from 0.45 to 0.65 or from 0.5 to 0.75. Even more specifically, the ratio of the peak height of the diffraction peak corresponding to Miller indices (104) to the peak height of the diffraction peak corresponding to Miller indices (003) using powder x-ray diffraction of the lithium metal oxides of the formula $Li_xNi_aCo_bMn_cO_2$ is 0.45 to 0.65 when a, b and c are all equal 0.33 or the ratio is 0.5 to 0.75 when a is 0.77, b is 0.13, c is 0.1. The shape of the agglomerates of the $Li_xNi_aCo_bMn_cO_2$ compounds according to the invention is preferably spherical. The shape of the primary particles of the $Li_xNi_aCo_bMn_cO_2$ compounds according to the invention is preferably spherical as well. The spherical shape of the agglomerate particles of the compounds according to the invention ensures excellent packing and thus high volumetric energy densities. More specifically, the sphericity of the agglomerate particles can be determined as set out in U.S. Pat. No. 5,476,530, columns 7 and 8 and FIG. 5, which method will give a particle shape factor that is a degree of the sphericity of the particles.

The particle shape factor can be determined from SEM micrographs of the corresponding powder particles by linear and particle shape analysis. The powders should be prepared in such a way that the sample studied by SEM is representative, i.e. preparation is not accompanied by any accumulation or depletion of fine or coarse powder particles.

The particle dimensions may be determined by the known method of intercept length measurement. The measurements of the particle circumference U and the particle area A (twodimensional projection of the particle onto the image surface) required for characterizing particle shape can be determined through the particle dimensions defined via $$d_U = U/\pi \quad d_A = (4A/\pi)^{1/2}$$

The particle shape factor f is derived from the area A and the particle circumference U in accordance with:

$$f = \left(\frac{d_A}{d_U}\right) = \left(\frac{4\pi A}{U^2}\right).$$

The diameters $d_U$ and $d_A$ characterize two different spherical comparison particles of which the projections onto the plane have (a) the same circumference U and (b) the same area A as the actual (investigated) particle wherein.
$d_U$=diameter of a circle of which the circumference $U=\pi d_U$ is equal to the projected particle circumference
$d_A$=diameter of a circle of which the area is equal to the (projected) particle area ($d_A \leq d_U$). For essentially spherical particles, f is about 1, more specifically from 0.88 to 1, in particular 0.9 to 1 or 0.93 to 1. The agglomerates of the $Li_xNi_aCo_bMn_cO_2$ compounds according to the invention preferably have a shape factor f of about 1, more specifically from 0.88 to 1, in particular 0.9 to 1 or 0.93 to 1.

The tap density of the $Li_xNi_aCo_bMn_cO_2$ compounds according to the invention generally is greater than 1.8 g/cm$^3$, more specifically greater than 2 g/cm$^3$. In one preferred embodiment of the invention, the $Li_xNi_aCo_bMn_cO_2$, compound is a compound selected from the group consisting of $LiNi_{0.33}Co_{0.33}Mn_{0.33}O_2$, $LiNi_{0.475}Co_{0.05}Mn_{0.475}O_2$, $LiNi_{0.5}Co_{0.2}Mn_{0.3}O_2$, $LiNi_{0.7}Co_{0.2}Mn_{0.1}O_2$ and $LiNi_{0.77}Co_{0.13}Mn_{0.1}O_2$. Furthermore, although the compounds set out immediately above are described as preferred, the present invention applies to compounds of the general formula $Li_xNi_aCo_bMn_cO_2$ other than the compounds mentioned above.

In particular, as would be readily understood by those skilled in the art, the other lithium metal oxides of the above formula (e.g., wherein a, b and c have different values than the specific compounds disclosed above) have a layered crystal structure similar to these compounds after appropriate thermal treatment as set out below. Therefore, the present invention applies to these compounds in general and suppressing the formation or transformation of the cubic spinel-like phases within the crystal or on the surface of the crystal, thereby enhancing the performance of the material in a lithium or lithium-ion secondary battery.

Table 1 shows additional compounds of the formula $Li_xNi_aCo_bMn_cO_2$ that are encompassed by the present invention when having a hexagonal layered structure that is substantially free from cubic-spinel like phases:

TABLE 1

| Compound | a | b | c | x |
|---|---|---|---|---|
| 1.001 | 0.9 | 0.01 | 0.09 | 1 |
| 1.002 | 0.9 | 0.09 | 0.01 | 1 |
| 1.003 | 0.9 | 0.05 | 0.05 | 1 |
| 1.004 | 0.85 | 0.1 | 0.05 | 1 |
| 1.005 | 0.6 | 0.2 | 0.2 | 1 |
| 1.006 | 0.5 | 0.1 | 0.4 | 1 |
| 1.007 | 0.5 | 0.4 | 0.1 | 1 |
| 1.008 | 0.5 | 0.45 | 0.05 | 1 |
| 1.009 | 0.5 | 0.3 | 0.2 | 1 |
| 1.010 | 0.4 | 0.4 | 0.2 | 1 |
| 1.011 | 0.32 | 0.32 | 0.32 | 1.04 |

The present invention further includes a method of preparing compounds having a substantially single phase, hexagonal layered crystal structure that are substantially free of localized cubic spinel-like structural phases. In accordance with this method, a lithium metal oxide is provided having the formula $Li_xNi_aCo_bMn_cO_2$, wherein a, b, c and x are as defined above at a temperature of at least about 600 C, and preferably of greater than 800° C. The lithium metal oxide can be provided at these temperatures by either synthesizing the material at these temperatures or by heating previously synthesized material.

The lithium metal oxide compounds of the invention can be prepared or synthesized by mixing together stoichiometric amounts of source compounds containing lithium, nickel, cobalt and manganese to give the desired molar ratio for the formula $Li_xNi_aCo_bMn_cO_2$ described above. The source compounds (raw materials) can be the pure elements but are typically compounds containing the elements such as oxides or salts thereof. For example, the source compounds are typically hydrated or anhydrous oxides, hydroxides, carbonates, nitrates, sulfates, chlorides or fluorides, but can be any other suitable source compound that will not cause elemental defects in the resulting lithium metal oxide compound. The elements for the lithium metal oxide compound can each be supplied from separate source compounds or at least two of the elements can be supplied from the same source compounds. In addition, the source compounds can be mixed in any desirable order.

Although the lithium metal oxide compounds are preferably prepared by solid state reactions, it can be advantageous to react the raw materials using wet chemistry such as sol-gel type reactions or spray drying techniques, alone or in combination with solid state reactions. For example, the source compounds comprising nickel, cobalt and manganese can be prepared as a solution in a solvent such as water and the compound comprising nickel, cobalt and manganese precipitated out of solution as an intimately mixed compound such as a hydroxide. The mixed compound can then be blended with a lithium source compound. The reaction mixture can also be prepared by suspending source compounds in a solution of other source compounds and spray drying the resulting slurry to obtain an intimate mixture. Typically, the selection of reaction methods will vary depending on the raw materials used and the desired end product.

In a preferred method embodiment of the invention, the lithium metal oxide ($Li_xNi_aCo_bMn_cO_2$) is prepared using a lithium source compound and a source compound for nickel, cobalt and manganese. In particular, the preferred lithium source compound is selected from the group consisting of Lithium carbonate and $LiOH.H_2O$ and the preferred source compound for nickel, cobalt and manganese is selected from the group consisting of $NiCoMnO_4$, $Ni_{0.33}Co_{0.33}Mn_{0.33}(OH)_2$, $Ni_{0.475}Co_{0.05}Mn_{0.475}(OH)_2$, $Ni_{0.5}Co_{0.2}Mn_{0.3}(OH)_2$, $Ni_{0.7}Co_{0.2}Mn_{0.1}(OH)_2$ and $Ni_{0.77}Co_{0.13}Mn_{0.1}(OH)_2$.

The source compound for nickel, cobalt and manganese preferably has a spherical shape of the agglomerates and usually a rice-corn-like shape of the primary particles. The primary crystallite size of the source compound for nickel, cobalt and manganese preferably has a broadened size distribution, which in a more preferred embodiment is at least a bimodal size distribution. Such compounds can be obtained in analogy to the process and the compounds as disclosed in European Patent Application EP-A-1406839.

The mixture once prepared can be reacted to form the lithium metal oxide. Preferably, the mixture is reacted by firing the mixture at a temperature between 600° C. and 1000° C. for sufficient time to produce the lithium metal oxide compound in a single phase. The mixture is generally fired for a total of between about 4 and about 48 hours, more specifically from 8 to 36 hours, or from 12 to 24 hours, or from 16 to 20 hours, in one or more firing steps. Any suitable apparatus can be used for firing the mixture, such as a rotary calciner, a stationary furnace or a tunnel furnace, that uniformly heats the source compounds to produce the lithium metal oxide $Li_xNi_aCo_bMn_cO_2$ according to the invention.

Once the lithium metal oxide is at its final preparation temperature or after previously synthesized lithium metal oxide has been reheated, the lithium metal oxide is cooled at a rate of less than 20° C./min, more specifically between 3° C./min and 20° C./min, or 3° C./min and 14° C./min, or from 3° C./min to 10° C./min, or from 3° C./min to 9° C./min, or at a cooling rate of less than 8° C./min. More specifically, the cooling rate in the area of from about the temperature of the heat treatment to about 300° C. is determined by a function $T=f*EXP(-R*t)$, wherein T is the temperature in degrees centigrade (° C.), f is a factor, R is the cooling rate and t is the cooling time in minutes, wherein f is from 600° C. to 1000° C. and R is from 0.0009 to 0.01. This function is not linear. More specifically, f is from 750° C. to 850° C. and R is from 0.001 to 0.009; or R is from 0.002 to 0.005. In particular, R is from 0.003 to 0.0044. It was found that the cooling rate according to the invention is not correctly reflected by a linear function but rather an exponential function as described above. Cooling at rates reflected by the above function was found to result in materials being virtually free of localized hetero-structural phases, e. g., cubic spinel-like phases.

With the lithium metal oxides of the invention, the lack of localized hetero-structural phases, e.g., cubic spinel-like phases, within the crystal and on the crystal surface does not induce further phase transformation that impedes the diffusion of the Li+ ions during the charge and discharge cycles. Thus, the hexagonal layered compounds of the invention have better and more consistent electrochemical performance than prior art compounds that are cooled at higher rates. The $Li_xNi_aCo_bMn_cO_2$ according to the invention contain less than 1 percent of cubic spinel-like phases, more specifically less than 0.5 percent, or from 0.05 to 0.4 percent, in particular even less than 0.05 percent. The $Li_xNi_aCo_bMn_cO_2$ according to the invention are, most preferably, entirely free of cubic spinel-like phases. The above mentioned content of 0 to 1 percent of cubic spinel-like phases is defined as being substantially free of localized cubic spinel-like structural phases within the meaning of the present invention.

Moreover, it has been discovered that cooling at a rate of more than 20° C./min, more specifically 10° C./min, in particular 8° C./min, results in the formation of localized cubic spinel-like structural phases on the surface of the crystal or within the crystal and thus decreased electrochemical performance. This effect is not limited to linear cooling functions, but can be also discovered when the materials are cooled at higher rates following an exponential function being substantially different from the function according to the invention as set out above.

During the heating step the shape of the agglomerates of the source compound for nickel, cobalt and manganese is preferably retained. This means, preferably the lithium metal oxide $Li_xNi_aCo_bMn_cO_2$ according to the invention has the same shape of the agglomerates as the source compound for nickel, cobalt and manganese. Preferably, the shape of the agglomerates of the $Li_xNi_aCO_bMn_cO_2$ according to the invention is spherical. At the same time, the shape of the primary particles changes from rice-corn-like to spherical. More specifically, during the heating the secondary structure, also known as the shape of the agglomerates, is retained while the shape of the primary particles, also known as the primary structure, is changed. With the shape of the agglomerates staying spherical and the shape of the primary particles changing from rice-corn-like to spherical, the overall appearance of the particles of the $Li_xNi_aCo_bMn_cO_2$ according to the invention is raspberry-like, like a sphere consisting essentially of smaller spheres.

The tap density of the $Li_xNi_aCo_bMn_cO_2$ compounds usually raises during the heating step and is generally greater than 1.8 g/cm³, more specifically greater than 2 g/cm³. It was surprisingly found that the tap density of the $Li_xNi_aCo_bMn_cO_2$ compounds according to the invention is lower than $Li_xNi_aCo_bMn_cO_2$ compounds that have been cooled at a higher rate than according to the present invention.

The heating step is carried out in an oxidizing atmosphere. An oxidizing atmosphere generally is an oxygen containing gas, like air or the mixture of a noble gas like helium, neon or argon with oxygen. Most preferably the atmosphere is oxygen.

The lithium metal oxide is preferably uniformly cooled in accordance with the invention. In particular, the lithium metal oxide material is preferably cooled at approximately the same rate. For example, the variation between the mean cooling rate and the cooling rate for any specific portion of the material should be less than about 10 percent. In a preferred embodiment of the invention, uniform cooling can be accomplished using a rotary calciner, or a stationary furnace or tunnel furnace with smaller bed depths. The uniformly cooled material prepared according to the invention has greater homogeneity and less variance in its material properties than material that is not uniformly cooled.

The present invention further includes lithium and lithium ion secondary batteries that include a positive electrode comprising the lithium metal oxides of the invention. Typically, the lithium metal oxide compound of the invention is combined with a carbonaceous material and a binder polymer to form a cathode. The negative electrode of the lithium battery can be lithium metal or alloys, or any material capable of reversibly lithiating and delithiating at an electrochemical potential relative to lithium metal between about 0.0 V and 0.7 V. Examples of negative electrode materials include carbonaceous materials containing H, B, Si and Sn; tin oxides; tin-silicon oxides; and composite tin alloys. The negative electrode is separated from the positive electrode material in the cell using an electronic insulating separator. The electrochemical cell further includes an electrolyte. The electrolyte can be non-aqueous liquid, gel or solid and preferably comprises a lithium salt, e.g., LiPF6. Electrochemical cells using the lithium metal oxide compounds of the invention as positive electrode material can be combined for use in portable electronics such as cellular phones, camcorders; and laptop computers, and in large power applications such as for electric vehicles and hybrid electric vehicles.

The lithium metal oxide compounds of the invention allow lithium ions to readily diffuse during both the charge and discharge cycles of the battery.

The lithium metal oxide compounds of the invention have been found to have good initial specific capacities and good cycleability as is desired in the art.

For example, the initial specific capacity of the $LiNi_{0.33}Co_{0.33}Mn_{0.33}O_2$ of the invention is greater than 140 mAh/g, preferably greater than 150 mAh/g when measured inbetween 3.0 and 4.3 V versus lithium at a constant current of C/3. In addition, the capacity loss over 100 cycles for the lithium metal oxides of the invention is less than 25%, more specifically less than 20%, in particular less than 10%, with a constant current of C/3 (3 hours for complete charge or discharge) when cycled between 3.0 and 4.3 V versus lithium.

The invention also relates to a method for creating a product specification for a batch, lot, or shipment of a chemical material, preferably a compound according to the invention, comprising specifying at least one property value for said batch, lot, or shipment. The property value may be a property value either specific for the chemical compound, like chemical formula, molecular weight, weight percentage of a certain element, melting point, boiling point or the like, or a property value specific to the lot, batch or shipment, like purity, a batch number or lot number, a list of ingredients of the formulation, grain size, shape of the particles, particle size distribution or the like. In particular, such method comprises the step of specifying at least one property to value per lot, batch or shipment, archiving the property values of said lots, batches or shipments in connection with information identifying the lot, batch or shipment, selecting at least one property value of at least one lot, batch or shipment, putting together the product specification by arranging the at least one property value of the identified said lot, batch or shipment in connection with information identifying the lot, batch or shipment and creating the product specification by displaying the at least one property value together with information identifying the lot, batch or shipment. Displaying within the meaning of this invention may be creating a paper copy of the product specification by, for example, printing by a computer printout or conventional printing, but also involves displaying the product specification on a computer screen. The display can be effected by a computer program having access to the archive of at least one property value in connection with information identifying the lot, batch or shipment, or by means of an internet webpage displayed in a web browser.

In a further embodiment, the method for creating a product specification is a method wherein the property value is included on a product specification sheet, purchase order, invoice, contract, waiver to a contract, or combinations thereof for the batch, lot, or shipment of a compound. Preferably, the compound or particulate material is a compound according to the invention, or a different nickel, cobalt or manganese compound.

In yet another embodiment of the invention the method for creating a product specification, is a method wherein said specifying comprises determining at least one property value for said batch, lot, or shipment of particulate material. Determining comprises measuring or analyzing said batch, lot, or shipment by conventional measuring methods and thus determining either a property value specific for the lot, batch or shipment, or being specific for the chemical compound. If the property value to be determined is a property value specific to the chemical compound, the determining step does also encompass accessing the property value specific to the chemical compound in a directory comprising such property values. The directory may be available in physical form in a library or in the form of an electronic database. In the latter case, said determining can be carried out by means of a computer program. Preferably, the compound or particulate material is a compound according to the invention, or a different nickel, cobalt or manganese compound.

In a further embodiment of the invention, the method for creating a product specification is a method wherein said specifying comprises characterizing the batch, lot, or shipment of particulate material by at least one interfacial potential value. Preferably, the compound or particulate material is a compound according to the invention, or a different nickel, cobalt or manganese compound.

In a further embodiment of the invention, the method for creating a product specification further comprises the step of specifying at least one morphological value like surface area, particle size, structure, porosity, tap density, particle shape factor or combinations thereof, to said batch, lot, or shipment of particulate material. Preferably, the compound or particulate material is a compound according to the invention, or a different nickel, cobalt or manganese compound.

The present invention also relates to a method of doing business with a customer comprising using a product specification that includes a property value to request a certain batch, lot, or shipment and/or to provide a certain batch, lot, or shipment of chemical material.

Such a process involves the steps of providing a product specification, preferably a product specification as set out above, to the customer, the customer choosing at least one property value of at least one lot, batch or shipment suitable for his purposes, identifying the lot, batch or shipment providing a chemical material suitable for the customers purposes, selecting said lot, batch or shipment and placing an order for said selected lot, batch or shipment.

Additionally, the method may further comprise the step providing the ordered lot, batch or shipment to said customer having selected the lot, batch or shipment.

The present invention also extends to a method for improving identification of a grade, type, or brand of chemical material comprising the step of updating an existing product description for the grade, type, or brand of particulate material by adding at least one property value. Preferably, the compound or particulate material is a compound according to the invention, or a different nickel, cobalt or manganese compound.

The present invention also extends to a method for creating a product specification, a method for improving identification of a grade, type, or brand of chemical material as set out above or a method of doing business with a customer comprising using a product specification wherein said product description is in a catalogue, web site, brochure, chemical material literature, advertisement, label, or combinations thereof. Preferably, the compound or particulate material is a compound according to the invention, or a different nickel, cobalt or manganese compound.

The present invention will now be further demonstrated by the following non-limiting examples.

EXAMPLE 1

3150 g of powdery $Ni_{0.33}Co_{0.33}Mn_{0.33}(OH)_2$ having a tap density of 1.74 g/cm³ was dry mixed with 1362 g of powdery lithium carbonate $Li_2Co_3$ having a particle size of less than 57 μm. The mixture was divided into five equal portions that were subjected to calcination at 860° C. for 20 hours in a gas stream of 300 l/h oxygen at a pressure of 1000 mbar.

To obtain sample 1, the material taken from the furnace was quench cooled by taking the sample directly from the hot zone and spreading the sample onto a stainless steel pan at room temperature. The cooling rate was calculated at about 22° C./minute, Tap density of Sample 1 was found to be 2.21 g/cm³. The temperature of the material was recorded over the time and found to follow the formula $T=830.07*EXP(-0.0345*t)$ in the temperature range down to 300° C. Sample 2 was obtained by calcining another portion of the mixture that was subjected to calcination at 860° C. for 20 hours in a gas stream of 300l/h oxygen at a pressure of 1000 mbar and allowed to cool in the switched-off furnace. The cooling temperature was measured as being 4° C./minute in the first hour and about 2° C./minute during cooling to room temperature. The temperature of the material was recorded over the time and found to follow the formula $T=814.44*EXP(-0.0031*t)$ in the temperature range down to 300° C. The tap density of Sample 2 was measured to be 2.03 g/cm³.

Sample 1 and the sample 2 were used as positive electrode materials for different electrochemical cells, each cell using a half cell configuration with Li metal as the negative electrode and as reference electrode. The electrolyte was 1M LiPF6 in a 1:1:1 mixture of ethylene carbonate, dimethyl carbonate and diethyl carbonate solvents. The positive electrode consisted of 83% active material (by weight), 10% Carbon Black Super P and 7% polytetrafluoroethylene (PTFE) as a binder. The cycle tests were conducted between 3.0 and 4.3 V using a constant current of C/3 (3 hours for complete charge or discharge) in both charge and discharge.

FIG. 1 compares the cycle performance of sample 1 and sample 2. As shown in FIG. 1, sample 2 retains more capacity upon cycling than sample 1 and has much improved cycle performance over sample 1.

Sample 2 prepared according to the invention was further tested using powder x-ray diffraction with Cu Ka radiation to determine if this material had a substantially single-phase, hexagonal layered structure.

Figure 2:
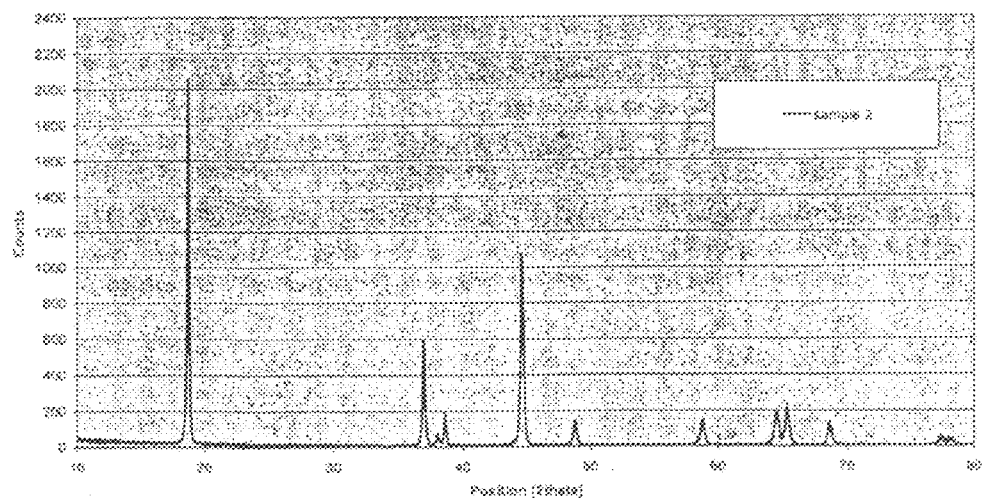
FIG. 2 is a powder x-ray diffraction pattern for a compound according to the invention (sample 2) using Cu Kα radiation.

As shown in FIG. 2, sample 2 has no diffraction peaks using powder x-ray diffraction at a smaller scattering angle than the diffraction peak corresponding to Miller indices (003), as desired in accordance with the invention. FIGS. 3 and 4 show how the spherical shape of the agglomerates is retained while the rice-corn-like shape of the primary particles changes to a spherical shape.

EXAMPLE 2

A commercial $LiNi_{0.5}Co_{0.2}Mn_{0.3}O_2$ sample was heated to 860 C for 1 hour and then quench cooled by taking the sample directly from the hot zone and spreading the sample onto a stainless steel pan at room temperature to obtain sample 3. The cooling rate was calculated at about 22° C./minute. The temperature of the material was recorded over the time and found to follow the formula $T=823.85*EXP(-0.0401*t)$ in the temperature range down to 300° C.

A sample of the same batch $LiNi_{0.5}Co_{0.2}Mn_{0.3}O_2$ was heated to 860 C for 1 hour and allowed to cool in the switched-off furnace as set out in Example 1. The cooling temperature was measured as being 4° C./minute in the first hour and about 2° C./minute during the further cooling to room temperature. The temperature of the material was recorded over the time and found to follow the formula $T=813.02*EXP(-0.0034*t)$ in the temperature range down to 300° C.

Samples 3 and 4 were cycle tested according to the method described in Example 1. Sample 4 prepared according to the invention has better cycling performance than sample 3.

It is understood that upon reading the above description of the present invention and reviewing the accompanying drawings, one skilled in the art could make changes and variations therefrom. These changes and variations are included in the spirit and scope of the following appended claims. All references cited herein are incorporated by reference for all useful purposes.

The invention claimed is:

1. A method of preparing a compound having a substantially single phase, hexagonal layered crystal structure and being substantially free of localized cubic spinel-like structural phases, the method comprising the steps of providing a lithium metal oxide having the formula $Li_xNi_aCo_bMn_cO_2$, wherein a and c are independently of each other a number from 0.05 to 0.8, b is a number between 0.05 and 0.50, $0.95 \leq (a+b+c) \leq 1.02$, and x being a number from 0.98-1.05 while $x+a+b+c=2$, at a temperature of at least about 600° C.; and cooling the lithium metal oxide at a cooling rate in which temperature is a function of time and is determined by a formula of $T=f*EXP(-R*t)$, wherein T is the temperature in degrees centigrade, and t is the cooling time in minutes, wherein f is from 600° C. to 1000° C. and R is from 0.0009 to 0.01, and the function is non linear.

2. The method according to claim 1, wherein f is from 750° C. to 850° C. and R is from 0.001 to 0.009.

3. The method according to claim 1, wherein R is from 0.002 to 0.005.

4. The method according to claim 1, wherein R is from 0.003 to 0.0044.

5. The method according to claim 1, wherein said cooling step comprises uniformly cooling the $Li_xNi_aCo_bMn_cO_2$ compound.

6. The method according to claim 1, wherein said providing step comprises synthesizing the $Li_xNi_aCo_bMn_cO_2$ compound at a temperature of at least about 600° C.

7. The method according to claim 1, wherein said providing step comprising heating a previously-synthesized $Li_xNi_aCo_bMn_cO_2$ compound to a temperature of at least about 600° C.

8. The method according to claim 1, wherein b is a number between 0.05 and 0.45.

* * * * *